3,370,004
DRILLING FLUID COMPOSITION
Jack Herman Park, Houston, Tex., assignor to Texaco Inc., New York, N.Y., a corporation of Delaware
No Drawing. Filed Mar. 31, 1964, Ser. No. 356,027
19 Claims. (Cl. 252—8.5)

This invention relates to a novel aqueous drilling fluid for drilling wells through sub-surface formations by means of well drilling tools, and particularly to such an aqueous well drilling fluid containing a novel dispersant composition, a method of drilling wells employing an aqueous drilling fluid containing the novel dispersant composition therein and a drilling fluid additive composition containing the dispersant composition for use in preparing an aqueous drilling fluid.

Drilling fluids, or muds as they are sometimes called, are slurries of clayey solids used in the drilling of wells for tapping underground collections of oil, gas, brine, or water. Such fluids have a number of different functions, the most important of which are to assist in the removal of cuttings from the well, to seal off formations of gas, oil, or water which may be encountered at different levels, to lubricate the drilling tool and drill pipe which carries the tool, and to hold the cuttings in suspension in event of shut-downs in drilling.

An ideal drilling fluid is a thixotropic colloidal system, i.e., a fluid which on agitation or circulation (as by pumping or otherwise), has a measurable relatively low viscosity and is free flowing (not plastic), particularly at high temperatures; but when such agitation or circulation is halted, the fluid sets or gels. The rate of gel formation is such as to permit the cuttings to fall only a short distance the gel structure is sufficiently strong to support them.

When a drilling fluid having the proper viscosity, the proper gel rate and proper gel strength for circulation through a well bore is permitted to stand in the well bore in the quiescent state, it develops sufficient gel strength to prevent settling of the cuttings, sand or weighting material, etc., in the well bore when it becomes necessary to discontinue circulation for any appreciable period of time. Such a fluid is also characterized by its ability to form a mud cake on the borehole wall, thereby assisting in sealing off the traversed formations and inhibiting so-called water loss, i.e., loss of water from the drilling fluid.

According to the present invention the dispersant composition comprises dialdehyde starch and an inorganic chromate which is effective in dispersing clayey solids in an aqueous drilling fluid, and reducing the viscosity and gel strength of the drilling fluid containing same. The dispersant composition contains from 60 to 90 percent of dialdehyde starch and from 40 to 10 percent of the inorganic chromate, on a weight basis. A particularly preferred composition contains from 70 to 85 percent of the dialdehyde starch and from 30 to 15 percent of the inorganic chromate, on a weight basis, as this composition produces the most effective results in terms of viscosity and gel strength reduction.

The dialdehyde starch component of the drilling fluid dispersant composition of the present invention is a periodate oxidized dialdehyde starch preferably prepared by the electrolytic oxidation method disclosed by Dvonch and Mehltreter in U.S. 2,648,629.

The dialdehyde starches that are 50% or more oxidized, i.e. the number of original anhydroglucose units now in the dialdehyde form, per 100 units of the starch molecule, is 50% or more, have been found to be satisfactory dialdehyde starches for use in the dispersant compositions of the present invention. It has been found that dialdehyde starches which are at least 75% oxidized are particularly preferred since such oxidized starches are most effective in reducing the viscosity and gel strengths of drilling fluids containing same, particularly in aqueous low pH and gyp type mud systems. Such dialdehyde starches are obtainable from the Miles Chemical Company under the trademark SUMSTAR.

The dialdehyde starch component of the drilling fluid dispersant composition of the present invention is distinct from the prior art type starch materials heretofore used as water loss agents in drilling fluids, such as starch materials sold under the trade names Impermix and My-Lo-Gel. These known water loss agents are not dialdehyde starches as hereinabove defined and moreover they are ineffective as dispersants in drilling fluids alone or in combination with water soluble chromates.

The inorganic chromate component of the dispersant composition of the present invention may be a water soluble inorganic chromate or polychromate including mixtures thereof. Representative water soluble inorganic chromates and polychromates that are satisfactory in the compositions of the present invention include the alkali metal and ammonium chromates and dichromates such as the sodium, potassium and lithium chromates and dichromates, ammonium chromate and dichromate and the calcium and magnesium chromates and dichromates. Preferred chromates are the sodium and potassium chromates and dichromates.

It is surprising that a dialdehyde starch in combination with a chromate exhibits dispersing activity in an aqueous drilling fluid since neither the dialdehyde starch alone or a chromate alone is a drilling fluid dispersant, i.e. effective in reducing the viscosity and gel strength values of aqueous drilling fluids.

The dispersant composition is effective in a variety of aqueous drilling fluids such as a low lime mud, a gyp mud, a shale control mud such as more particularly described in the Weiss and Hall patent U.S. 2,803,783, a high pH low lime mud and a sea water mud, the compositions of which are well known in the art.

The dispersant composition of the present invention is generally used in an aqueous drilling fluid in an amuont of from about 0.25 to about 10 pounds per barrel. A range of from about 3 to about 6 pounds of the composition per barrel of drilling fluid is particularly preferred as the most satisfactory reduction in viscosity and gel strength is obtained at this concentration.

Amounts of less than about 0.25 pound of the dispersant composition per barrel do not produce satisfactory results in terms of effective dispersion of clay. Amounts above about 10 pounds of the dispersant composition per barrel of drilling fluid do not produce any additional beneficial results.

A drilling fluid in accordance with this invention can be prepared by the addition of the dispersant composition to the aqueous drilling fluid containing hydratable clay material therein togeher with the addition of the usual drilling fluid additives such as a water loss material, a weighting material and the like as desired. If desired, one may first add the dialdehyde starch component to the aqueous drilling fluid and then add the chromate material or the order of addition of the dialdehyde starch and the chromate can be reversed.

In accordance with another feature of the invention, there is provided a drilling fluid additive dispersant composition which is preferably in dry solid form but which also may be used in the form of an aqueous slurry or solution of the dispersant composition of the invention. In this particular embodiment the percentage compositions of the components referred to hereinabove should be used.

The drilling fluids used to demonstrate the present invention were prepared in the following manner.

In all of the examples a top hole spud mud obtained from a commercial well in Caillou Island, Louisiana area, was used as the base mud. This mud had a solids content of about 14% by volume and weighed 10.2–10.5 pounds per gallon.

Example 1

A portion of the base mud was converted to a low pH drilling fluid by adding thereto 2 lbs. of a 75–80% oxidized dialdehyde starch (SUMSTAR R) and 0.25 lb. of sodium hydroxide, per barrel of drilling fluid.

Physical tests on the drilling fluid showed that the dialdehyde starch exhibited no dispersing properties.

Example 1A

Sodium chromate in an amount of 1 pound per barrel was added to the top hole spud mud used as the base mud in the examples. Physical tests showed no reduction in viscosity, or gel strength.

Examples 2 and 3

Two additional portions of the base mud were converted to a low pH drilling fluid as described in Example 1 above using dialdehyde starches, 50% and over 90% oxidized (SUMSTAR J and S) respectively.

Physical tests on the resultant drilling fluids in each case showed that these dialdehyde starches were ineffective drilling fluid dispersants.

Examples 4 to 6

Examples 1–3 were repeated, adding in each example sodium chromate in an amount of 1 lb. per barrel to the drilling fluids.

Physical tests conducted on each of the resulting drilling fluids showed that the combination of dialdehyde starch and chromate formed an effective drilling fluid dispersant composition in each case. Test results are shown in the table below.

Example 7

Another portion of the base mud was converted to a gyp mud system by adding thereto 5 lbs. of a 75–80% oxidized dialdehyde starch (SUMSTAR R), 6 lbs. of calcium sulfate dihydrate, per barrel of drilling fluid, and sufficient sodium hydroxide to adjust the pH of the drilling fluid to a value of 8.5–9.0.

Physical tests conducted on the resulting drilling fluid showed that the dialdehyde starch was ineffective as a drilling fluid dispersant in a gyp mud.

Examples 8 and 9

Two additional portions of the base mud were converted to gyp muds by the method of Example 7 using 50% and over 90% oxidized dialdehyde starches (SUMSTAR J and S), respectively, as the dialdehyde starches.

Physical tests conducted on the resultant drilling fluids showed that neither of these dialdehyde starches was a drilling fluid dispersant in a gyp mud.

Examples 10 to 12

Examples 7 to 9 inclusive, were repeated, and in each there was added 1 lb. per barrel of sodium chromate to the gyp mud.

Physicals tests conducted on the resultant drilling fluids showed that the combination of the dialdehyde starch and sodium chromate formed an effective drilling fluid dispersant composition in each case. The results of these tests are shown in the following table.

Example 13

A portion of the base mud was converted to a shale control drilling fluid by the addition of 3 lbs. of lime, 0.6 lb. of calcium chloride and 3 lbs. of a 75–80% oxidized dialdehyde starch (SUMSTAR R).

Physical tests on this drilling fluid showed that the dialdehyde starch was not an effective drilling fluid dispersant in a shale control drilling fluid.

Example 14

Example 13 was repeated using a 50% oxidized dialdehyde starch (SUMSTAR J). This dialdehyde starch exhibited no dispersing properties in the shale control drilling fluid.

Examples 15 and 16

Examples 13 and 14 were repeated after incorporating in each drilling fluid 1 lb. per barrel of sodium chromate.

Physical tests conducted on each of the resultant drilling fluids showed that the combination of dialdehyde starch and sodium chromate formed an effective drilling fluid dispersant composition in a shale control type drilling fluid in each case. Results of the physical tests on these examples are shown in the following table.

TABLE

| Ex. | Type Mud | Type and Amount of Dialdehyde Starch, lbs./bbl. | Amount of Sodium Chromate, lbs./bbl. | Stormer Viscosity (r.p.m.) 600 | Stormer Viscosity (r.p.m.) 300 | Gel strength (Shear Tube) 0 [1] | Gel strength (Shear Tube) 10 [1] | API, H₂O Loss 30′ (c.c.) | pH | Ca++ (p.p.m.) |
|---|---|---|---|---|---|---|---|---|---|---|
|  | Base Mud |  |  | [1] T.V. | T.V. | 60+ | 60+ | 12.4 | 8.6 | 80 |
| 1A |  |  | 1 | T.V. | T.V. |  |  |  |  |  |
| 4 | LpH [2] | 2–R [3] | 1 | 84.1 | 101.2 | 0[1.5] | 0[2.5] | 12.0 | 9.88 | 80 |
| 5 | LpH | 2–J [4] | 1 | 89.9 | 114.2 | 0[2] | 0[3.5] | 11.4 | 9.81 | 40 |
| 6 | LpH | 2–S [5] | 1 | 70.0 | 82.4 | 0[1] | 0[2] | 12.2 | 9.72 | 80 |
| 10 | GYP | 5–R | 1 | 13.7 | 8.4 | 0[0.5] | 0[0.5] | 30.2 | 8.78 | 960 |
| 11 | GYP | 5–J | 1 | 16.4 | 14.3 | 0[0.6] | 0[1] | 31.8 | 9.0 | 840 |
| 12 | GYP | 5–S | 1 | 15.5 | 15.4 | 0[0.5] | 0[1.5] | 29.2 | 8.21 | 1,360 |
| 15 | SC [6] | 3–R | 1 | 37.4 | 125.8 | 3.7 | 5.0 | 44.6 | 11.88 | 480 |
| 16 | SC | 3–J | 1 | 49.3 | 168.2 | 4.8 | 5.3 | 35.6 | 12.02 | 400 |

[1] T.V. = Too Viscous to measure.
[2] LpH = Low pH mud.
[3] SUMSTAR R = 75–80% oxidized dialdehyde starch.
[4] SUMSTAR J = 50% oxidized dialdehyde starch.
[5] SUMSTAR S = 90+% oxidized dialdehyde starch.
[6] SC = Shale Control Mud.

The data in the table above show that the dispersant compositions of the present invention improve the physical properties of a variety of aqueous drilling fluids. The very low viscosity and gel strength values shown in the table for the gyp muds (Examples 10–12) demonstrate that the dispersant compositions are particularly effective in this mud system. The results of the physical tests shown in the table for the low pH and shale control drilling fluids demonstrate that the compositions of the present invention are effective dispersants in these mud systems.

Obviously, many modifications and variations of the invention as hereinbefore set forth, may be made without departing from the spirit and scope thereof, and therefore only such limitations should be imposed as are indicated in the appended claims.

I claim:

1. A drilling fluid dispersant composition comprising 60 to 90% by weight of a dialdehyde starch produced by periodate oxidation of starch to at least 50% and 40 to 10% by weight of an inorganic chromate selected from the group consisting of a water soluble alkali metal-, ammonium-, calcium- and magnesium-chromate, -polychromate and mixtures thereof.

2. A drilling fluid dispersant composition as claimed in claim 1 wherein the composition comprises 70-85% by weight of said dialdehyde starch and 30-15% by weight of said chromate.

3. A drilling fluid dispersant composition as claimed in claim 1 wherein said dialdehyde starch is produced by periodate oxidation of starch to at least 75%.

4. A drilling fluid dispersant composition as claimed in claim 1 wherein said dialdehyde starch is produced by periodate oxidation of starch to at least 90%.

5. A drilling fluid dispersant composition as claimed in claim 1 wherein the inorganic chromate is sodium chromate.

6. A drilling fluid dispersant composition as claimed in claim 1 wherein the inorganic chromate is sodium dichromate.

7. An aqueous drilling fluid containing clay solids dispersed in the aqueous phase by a dispersant composition comprising 60 to 90% by weight of a dialdehyde starch produced by periodate oxidation of starch to at least 50% and 40 to 10% by weight of an inorganic chromate selected from the group consisting of a water soluble alkali metal-, ammonium-, calcium- and magnesium-chromate, -polychromate and mixtures thereof, said dispersant composition being present in the drilling fluid in an amount sufficient to disperse the clayey solids therein.

8. An aqueous drilling fluid as claimed in claim 7, containing from 3 to 6 pounds of the dispersant composition per barrel of drilling fluid.

9. An aqueous drilling fluid as claimed in claim 7 wherein the dialdehyde starch is produced by periodate oxidation of starch to at least 75–80%.

10. An aqueous drilling fluid as claimed in claim 7 wherein said dialdehyde starch is produced by periodate oxidation of starch to at least 90%.

11. An aqueous drilling fluid having a pH in the range 11.2–12.5 comprising an alkaline aqueous phase, a hydrated drilling clay dispersed in said aqueous phase by a dispersant composition comprising 60 to 90% by weight of a dialdehyde starch produced by periodate oxidation of starch to at least 50% and from 40 to 10% by weight of an inorganic chromate selected from the group consisting of a water soluble alkali metal-, ammonium-, calcium- and magnesium-chromate, -polychromate and mixtures thereof, said aqueous phase consisting essentially of a saturated solution of calcium hydroxide and containing a water soluble calcium salt therein having a water solubility greater than that of calcium hydroxide to provide a calcium ion concentration of at least 200 p.p.m. by weight to the aqueous phase and sufficient to stabilize and control the mud-making properties of heaving shale material in contact with the drilling fluid.

12. An aqueous drilling fluid as claimed in claim 11 wherein the dialdehyde starch is produced by periodate oxidation of starch to at least 90%.

13. An aqueous drilling fluid as claimed in claim 11 wherein the dispersant composition is present in an amount of from about 3 to 6 lbs. by weight per barrel of drilling fluid.

14. An aqueous drilling fluid as claimed in claim 11 wherein the dispersant composition comprises 70 to 85% of said dialdehyde starch and 30 to 15% of inorganic chromate on a weight basis.

15. In the drilling of a bore hole through a subterranean formation wherein an aqueous drilling fluid is passed through the bore hole in contact with said formation during the drilling operation, the improvement which comprises contacting said formation with an aqueous drilling fluid comprising a hydratable clayey material dispersed in an aqueous phase by a dispersant composition comprising 60 to 90% by weight of a dialdehyde starch produced by periodate oxidation of starch to at least 50% and 40 to 10% by weight of an inorganic chromate selected from the group consisting of a water soluble alkali metal-, ammonium-, calcium- and magnesium-chromate, -polychromate and mixtures thereof.

16. A method as claimed in claim 15 wherein said dialdehyde starch is produced by periodate oxidation of starch to at least 75%.

17. A method as claimed in claim 15 wherein the dispersant composition is present in the aqueous drilling fluid in an amount of from 3 to 6 pounds per barrel of drilling fluid.

18. A method as claimed in claim 15 wherein the inorganic chromate is sodium chromate.

19. A method as claimed in claim 15 wherein the inorganic chromate is sodium dichromate.

References Cited

UNITED STATES PATENTS

| | | | |
|---|---|---|---|
| 2,452,021 | 10/1948 | Wayne | 252—8.5 |
| 2,557,473 | 6/1951 | Ryan | 252—8.5 |
| 2,605,221 | 7/1952 | Hoeppel | 252—8.5 |
| 2,648,629 | 8/1953 | Dvonch et al. | 260—233.3 X |
| 2,868,726 | 1/1959 | Brukner et al. | 252—8.5 |
| 2,894,945 | 7/1959 | Hofreiter et al. | 260—233.3 |
| 2,929,811 | 3/1960 | Hofreiter et al. | 260—233.3 |

LEON D. ROSDOL, *Primary Examiner.*

SAMUEL H. BLECH, *Examiner.*

H. B. GUYNN, *Assistant Examiner.*

UNITED STATES PATENT OFFICE
CERTIFICATE OF CORRECTION

Patent No. 3,370,004                          February 20, 1968

Jack Herman Park

It is certified that error appears in the above identified patent and that said Letters Patent are hereby corrected as shown below:

Column 1, line 35, before "the" insert -- before --. Column 4, line 7, after "each" insert -- case --. Column 5, line 45, after "90%" insert -- and said inorganic chromate is sodium chromate --.

Signed and sealed this 16th day of September 1969.

(SEAL)
Attest:

Edward M. Fletcher, Jr.                    WILLIAM E. SCHUYLER, JR.
Attesting Officer                              Commissioner of Patents